Patented Mar. 29, 1927.

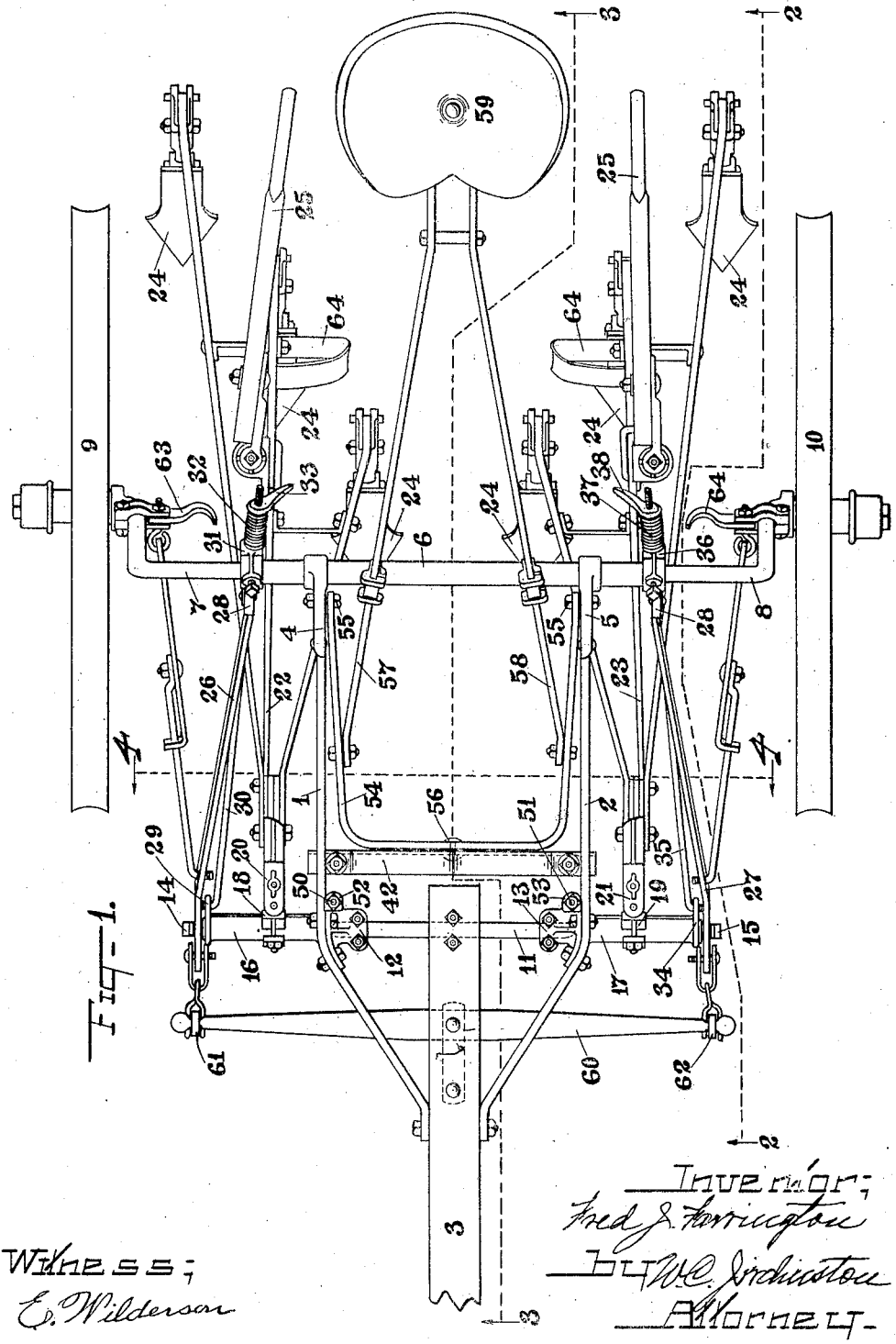

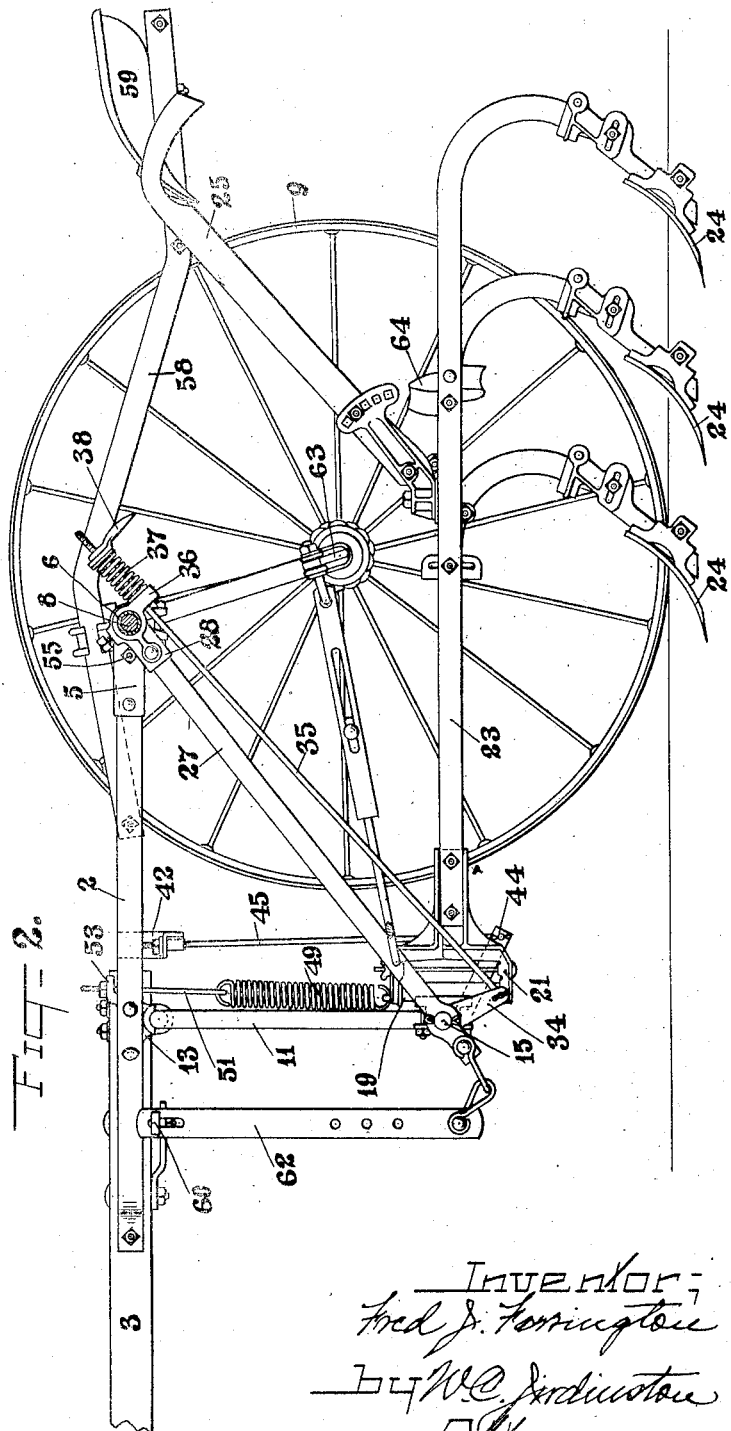

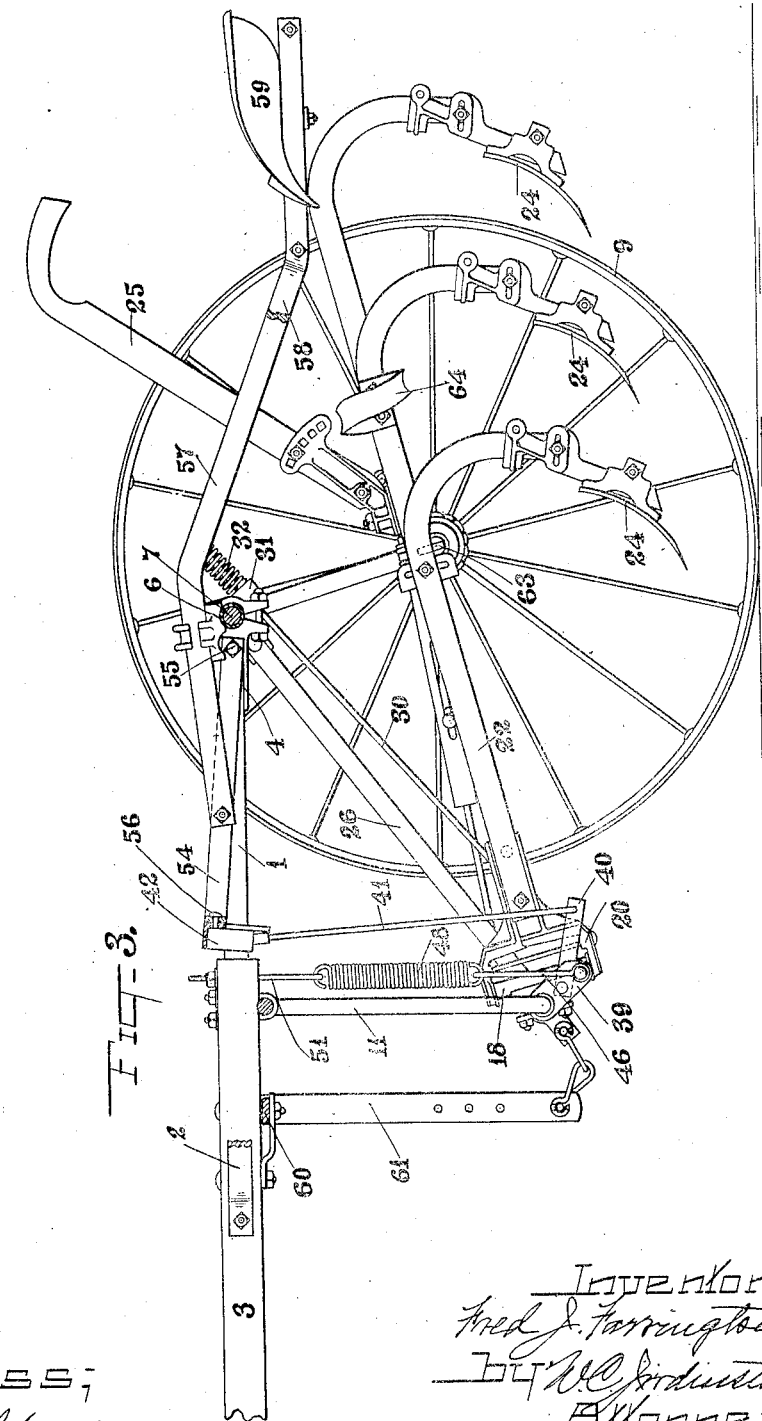

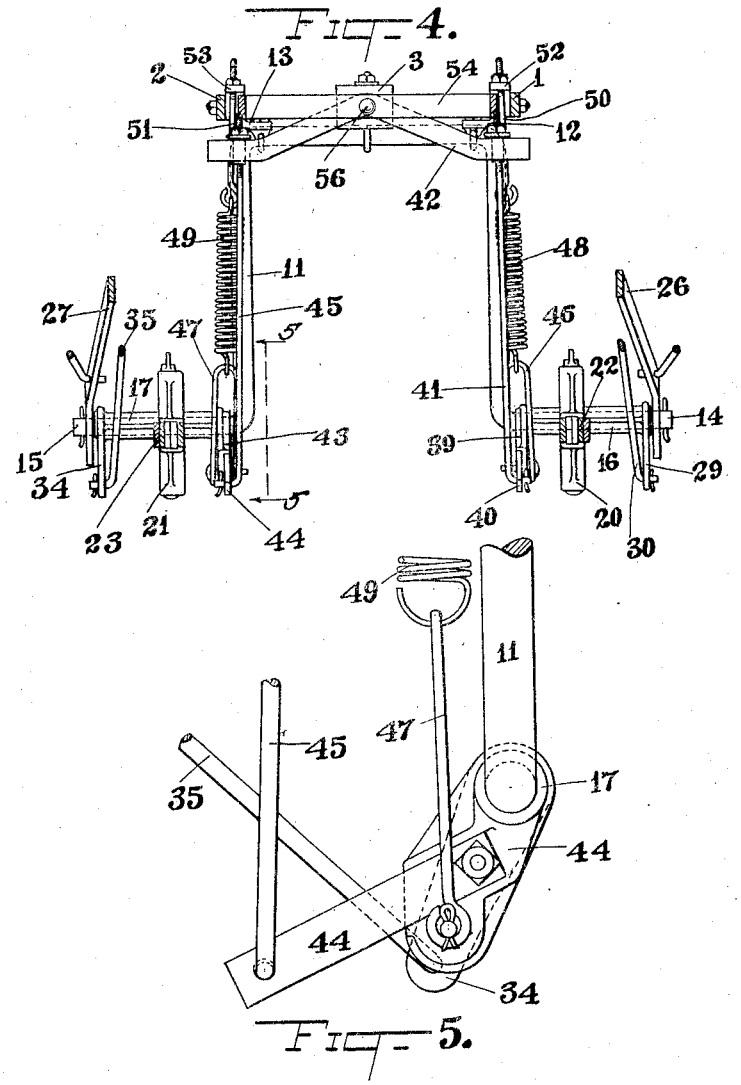

1,622,863

UNITED STATES PATENT OFFICE.

FREDERICK J. FARRINGTON, OF OMAHA, NEBRASKA, ASSIGNOR TO DEERE & COMPANY, OF MOLINE, ILLINOIS, A CORPORATION OF ILLINOIS.

CULTIVATOR.

Application filed March 23, 1925. Serial No. 17,485.

My invention relates to wheeled cultivators, and has for its object improvements in the mechanism employed in raising and lowering the cultivator rigs.

Referring to the drawings in which similar numerals indicate identical parts—

Figure 1 is a plan view of a wheeled cultivator embodying my improvements.

Figure 2 is a sectional view on the line 2—2 of Figure 1 with the cultivating rigs lowered and in the ground.

Figure 3 is a sectional view on the line 3—3 of Figure 1 with the cultivating rig raised.

Figure 4 is a fragmentary view on the line 4—4 of Figure 1, and

Figure 5 is an enlarged detail, as indicated by the line 5—5 of Figure 4.

The main frame of the cultivator is composed of side bars 1 and 2, their forward portions converging to a pole or tongue 3. The rearward ends of the bars 1 and 2 are secured respectively to the brackets 4 and 5 mounted on a tubular member 6, a part of the frame; crank axles 7 and 8 are supported in the tubular member 6 and carry ground wheels 9 and 10. Forwardly on the bars 1 and 2, an arch 11 is supported in brackets 12 and 13 mounted respectively on the bars 1 and 2; spindles 14 and 15, which are preferably integral with the lower ends of the arch 11, have rockably journaled upon them sleeves 16 and 17, and to the sleeves are rigidly secured respectively parts 18 and 19 of the gang couplings, of a well known type, and to the second parts 20 and 21 of the couplings are bolted the beams 22 and 23 carrying gangs of ground-working devices 24, to each beam is secured a handle 25, by which either or both beams and gangs can be raised or lowered. Braces 26 and 27 are secured to the ends of the spindles 14 and 15 respectively, and extend rearwardly and upwardly to brackets 28 to which they are bolted.

Preferably integral with the sleeve 16 is an arm 29, extending downwardly, and connected to the end thereof is a rod 30, the opposite end of which passes through a rearwardly projecting portion 31 of the bracket 28; a coiled spring 32 on the rod 30 operates between the portion 31 and a hand nut 33 on the end of the rod, actuation of the hand nut 33 varying the tension of the spring to a greater or lesser degree as may be desired.

A similar arm 34 is preferably integral with the sleeve 17 and to it is connected a rod 35, having its rear portion extending through a projection 36 on the bracket 28, and with a coiled spring 37 mounted thereon between the projection 36 and an adjustable hand nut 38 on the end of the rod.

To an extension 39, on the sleeve 16, is rigidly secured a lever 40 projecting rearwardly and connected to a vertical rod 41, the upper end of which passes through a suitable opening in an end of a yoke shaped member 42, and is secured thereto by a nut; the yoke shaped member extends transversely beneath and beyond the frame bars 1 and 2. The sleeve 17 has an extension 43 on which is rigidly mounted a lever 44 having a rod 45 connected to its rear end; the rod 45 extends vertically to an end of the member 42 through which it passes and to which it is secured by a nut. Inverted U-shaped links 46 and 47 are connected to the extensions 39 and 43 respectively by bolts which extend through eyes in the ends of the arms of the links and through said extensions. The links 46 and 47 are vertical and to the loops thereof are connected coiled springs 48 and 49 to the upper ends of which are attached eye bolts 50 and 51 extending upwardly through projections 52 and 53 preferably integral with the brackets 12 and 13 respectively.

A horizontally disposed arch 54 is located between the frame bars 1 and 2, and is pivotally mounted on the brackets 4 and 5 by bolts 55, which extend through the brackets and the rear ends of the frame bars 1 and 2 to the center of said arch is attached the member 42 by a bolt or rivet 56, on which the member 42 is adapted to rock. A seat frame, composed of bars 57 and 58 pivotally connected at their forward ends to the limbs of the arch 54, at points forward of the longitudinal center thereof, is rockably supported on the tubular member 6, the bars 57 and 58 converging rearwardly to carry an operator's seat 59. The draft mechanism consists of a bar 60 pivotally supported on the pole 3 and at the ends thereof are swinging pendant bars 61 and 62 shackled to the forward ends of the bars 26 and 27 respectively, and to which the draft animals are to be connected.

Secured on the gang beams respectively are stirrups 64 adapted to the feet of the driver so that he can readily hold the gangs down to work or swing them laterally independently or together. As the rigs are lowered, the tension of the springs 48 and 49 increases but the power of their pull decreases with the downward and forward swing of the extensions 39 and 43 toward the vertical axes of the legs of the arch 11, the extensions 39 and 43 being preferably integral with the sleeves 16 and 17 forming parts of the rig couplings. The swing of the extensions 39 and 43 operates the levers 40 and 44 to exert a downward pull on the rods 41 and 45 and, consequently, on the member 42 secured to the frame 54, and as the seat frame is pivotally attached to the frame 54, the weight of the gangs and the leg thrust of the driver operate to place the gangs in working position, the weight of the driver on the seat being lessened by the leg thrust exerted on the stirrups 64.

Either of the rigs can be raised or lowered independently of the other, or they can be raised or lowered simultaneously; when raised separately the member 42 will rock on its pivot on the arch 54, the rocking movement being limited by contact of the rising end of the member 42 with the frame side bars 1 and 2 as the case may be. When the gangs are raised together by operation of the handles 25, the feet of the operator having been removed from the stirrups 64, the entire weight of the operator is on the seat 59 and functions to rock the seat frame and the arch 54, on which the member 42 is supported, and as the said member is connected to the gang beams 22 and 23 by the rods 41 and 45 respectively, the weight of the operator aids in raising the gangs until the member 42 is in contact with the frame bars 1 and 2, after which the operator's weight has no further effect upon the gangs, but the latter can be raised further manually, the rods 41 and 45 slidingly freely upward in the holes in the member 42 through which they extend. The rods 41 and 45 are adjustable longitudinally, by operation of the nuts on their upper ends, to vary the distance between the member 42 and the gang beams 22 and 23.

I claim—

1. In a cultivator, the combination with the main frame, an axle and supporting wheels, of a horizontally disposed arch pivotally supported at its rear ends on the frame, a seat frame rockably supported on the axle and pivotally connected to said arch forward of the pivot of the latter, a seat on the rear of said frame, a rocking member extending transversely beneath the main frame and pivotally mounted centrally on said arch, beams carrying gangs of cultivating devices supported on the main frame, and means connecting said member with said beams.

2. In a cultivator, the combination with the main frame, an axle and supporting wheels, of a horizontally disposed arch pivotally supported at its rear ends on the frame, a seat frame rockably supported on the axle and pivotally connected to said arch forward of the pivots of the latter, a seat on the rear of the frame therefor, a rocking member extending transversely beneath the main frame and pivotally mounted centrally on said arch, beams carrying gangs of cultivating devices supported on the main frame for vertical and lateral movement, and vertical adjustable rods connected respectively to the ends of said member and with the respective gang beams.

3. In a cultivator, the combination with the main frame, an axle and supporting wheels, of a horizontally disposed arch pivotally supported at its rear ends on the frame, a seat frame rotatably supported on the axle and pivotally connected to said arch forward of the pivots of the latter, a seat thereon rearward of the axle, beams carrying gangs of cultivating devices supported on the main frame for vertical or lateral movement, stirrups on the beams adapted to be engaged by the operator's feet to swing the gang beams laterally or to regulate the depth of operation, means operable to raise the gang beams independently or simultaneously, a rocking member extending transversely beneath the main frame and pivotally mounted centrally on said arch, contacting with the main frame when the beams are raised, and connections between said member and the beams whereby the weight of the operator cooperates with said raising means to raise the beams.

4. In a cultivator, the combination with the main frame, an axle and supporting wheels, of a horizontally disposed arch pivotally supported at its rear ends on the frame, a seat frame rotatably supported on the axle and pivotally connected to said arch forward of the pivots of the latter, a seat thereon rearward of the axle, beams carrying gangs of cultivating devices supported on the main frame for vertical or lateral movement, stirrups on the beams adapted to be engaged by the operator's feet to swing the gang beams laterally or to regulate the depth of operation, means operable to raise the gang beams independently or simultaneously, a rocking member extending transversely beneath the main frame and pivotally mounted centrally on said arch, contacting with the main frame when the beams are raised, and adjustable connections between said member and the beams whereby the weight of the operator cooperates with said raising means to raise the beams.

5. In a cultivator, the combination with the main frame, an axle and supporting wheels, of a horizontally disposed arch pivotally mounted at its rear ends on the main frame, beams carrying cultivating devices pivotally supported on the main frame for vertical or lateral movement, means to raise said beams independently or simultaneously, a rocking member pivoted centrally on the arch and extending transversely beneath the frame, rods connecting the ends of said member with the beams, a seat frame rockably supported intermediate its length on the axle and pivotally attached to said arch forwardly of the pivots thereof, and a seat on the rear of the seat frame whereby the weight of an operator rocks the seat frame and said arch and cooperates with said raising means to raise the beams, said member contacting with the main frame as the beams are raised.

FRED J. FARRINGTON.